June 4, 1963
A. HOELLE ET AL
3,092,497
METHOD OF PRODUCING HOP EXTRACTS
Filed July 18, 1960
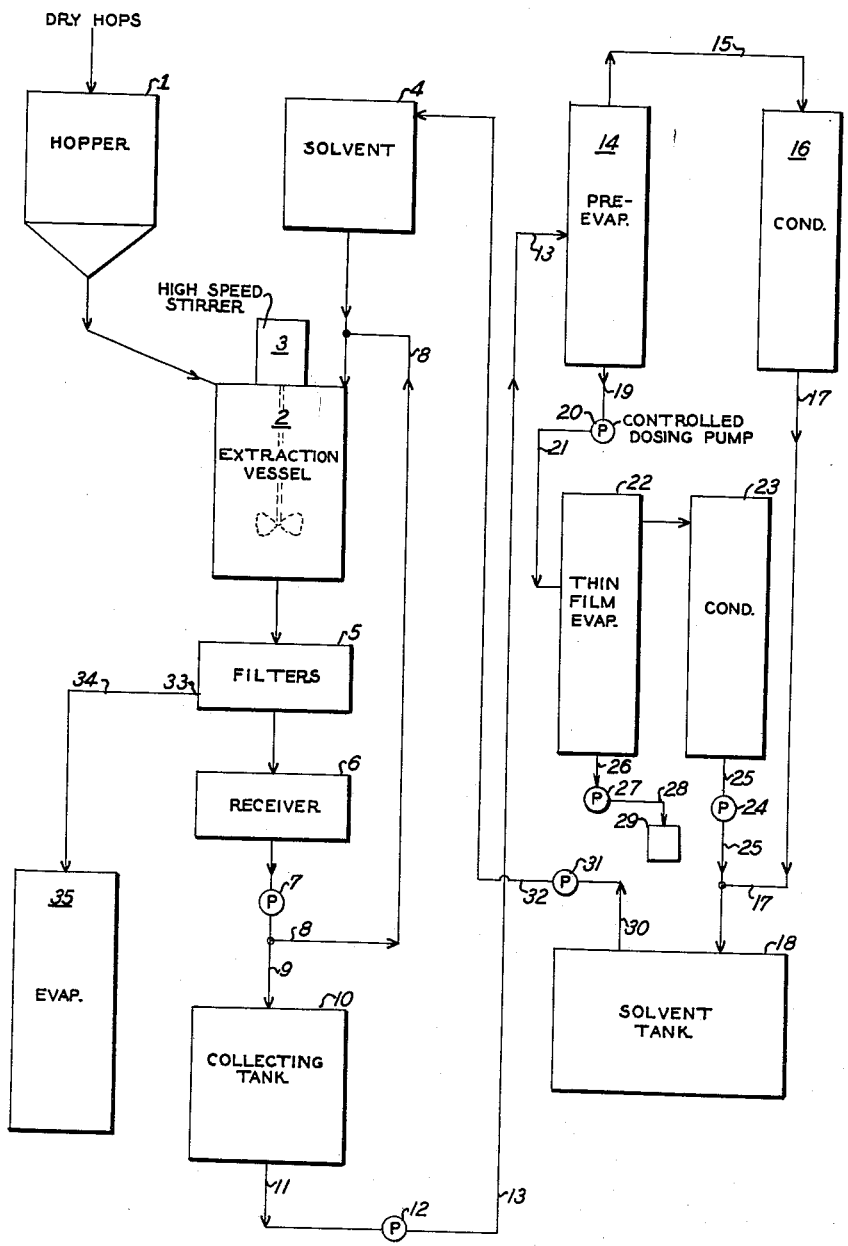
INVENTORS
ALFRED HOELLE
HEINZ VOLLMAR
BY
ATTORNEYS United States Patent Office 3,092,497
Patented June 4, 1963

3,092,497
METHOD OF PRODUCING HOP EXTRACTS
Alfred Hoelle and Heinz Vollmar, Rheinfelden, Germany, assignors to Maria Briem, Au-Hallertau, Germany
Filed July 18, 1960, Ser. No. 43,667
Claims priority, application Germany Mar. 11, 1960
5 Claims. (Cl. 99—50.5)

The present invention relates to a method of producing hop extracts.

Considerable efforts have been made in the past in the brewery industry in trying to find new methods to reduce the cost of production of beer and for this purpose to improve the yield in bitter principles, since in the normal boiling process only approximately 3.5% of these ingredients of the hops will pass as a boiled product into the beer.

It has previously been found that the production of beer may be considerably facilitated if a part of the hops or even the entire amount is replaced by a hop extract. If such an extraction of the hops is carried out by means of water and subsequently by organic solvents, such as alcohol, ether, or solvents containing halides, the yield in bitter principles will be considerably improved. When using such hop extracts, the addition in the volume of hops for each gallon of beer may be considerably reduced.

It has, however, been found that these known methods of producing a hop extract require very long extracting periods and only result in a low concentration of the extract. Unless the solutions may be used directly with water, it is generally necessary to expel therefrom very large quantities of solvents which, in view of the small yield, renders the extracting process very expensive.

It is an object of the present invention to provide an extraction method which is superior to the known methods and permits the hops to be extracted so completely by means of relatively small amounts of solvents that practically all substances of the hops which will be active in the brewing process, and particularly all bitter principles, will be contained in the extract.

A further object of the invention is to provide an extraction method which permits the production of a hop extract of a high concentration which has a practically unlimited stability and may be kept in storage for a great length of time, thus permitting the brewer to avoid the usual relatively high decrease in the value of pressed hops when kept in storage, and especially in years of high hop prices to require smaller amounts of pressed hop in his brewing process by resorting to greater additions of hop preserves. The new extraction method is also of great benefit to the hop using industry for the reason that in years of good harvest when the increased supply reduces the price thereof, greater amounts of hops may be preserved for marketing during years of poor harvest when, due to decreased supply, the prices are correspondingly increased, thus the prices for hops may be stabilized from year to year.

The method according to the present invention for a quick extraction of hops and also of other plants has been developed in years of experimentation, and its principal feature consists in extracting the hops in an extraction vessel by means of an organic solvent while being thoroughly mixed and broken up by the use of a high-speed stirrer.

More specifically, the method according to the invention is carried out as follows: A certain quantity of hops is extracted by means of a certain amount of solvent while being broken up into minute particles by a suitable dispersing apparatus. This procedure results within a few seconds of minutes in an extremely large increase in the surface area of the hops, whereby the glands of the hop blossoms, i.e. the lupulin will be exposed so as to be thoroughly acted upon by the solvent. By this quick extraction it is possible to dissolve within a few seconds or minutes and approximately at room temperature all of the substances of the hops which will be active in the brewing process, that is, the bitter principles, soft resins, and in certain measure also the tannic principles. The extraction process is thus carried out under exclusion of air and within a very short time.

The solvents to be applied in the new method may consist of any organic solvents which are suitable for dissolving the bitter principles, that is, ether, mixtures of ether and alcohol, petroleum ether, and hydrocarbons which are preferably chlorinated, such as methylene dichloride, isopropyl chloride, dichloroethylene, trichloroethylene, or perchloroethylene.

For carrying out the extraction in actual practice, a series of additional requirements as outlined below are preferably to be followed.

In order to save energy in concentrating the weak solutions, it is advisable to reuse the same solutions immediately as the solvent for subsequent hops charges. Such a reuse of the weak solutions as a solvent results in a concentration thereof, and it may be repeated several times so that in order to extract the hops completely, considerably smaller quantities of solvent will be required for any given amount of hops, and the losses in solvent will be considerably reduced. Generally, the weak solution of the extract may be reused for two to six further extraction processes.

It has further been found that, after filtering, the brewers' grains also still contain solvent residues. These residues are preferably likewise recovered, and for this purpose the brewers' grains are passed to an evaporator in which the residual solvents are evaporated, for example, by the direct insertion of steam. The solvents are then precipitated from the vapor in a cooling vessel, while the condensate of the solvent is returned to the solvent tanks for repeated use of the recovered solvent.

In treating the brewers' grains for recovery of the solvent, it is important that it will be carried out at the lowest possible temperature in order to prevent also at this stage of the process that the extracted substances will be unfavorably affected.

Another important feature of the invention resides in the use of a highly effective dispersing apparatus. It has been found in actual practice that it is very important that the peripheral speed of the dispersing head of the stirrer amounts to at least 2 m. per second and preferably at least 15 m. per second. Furthermore, it has been found advisable to move the dispersing head within the extraction mixture while the extraction is being carried out, preferably by raising and lowering the dispersing apparatus, in order to attain a uniform extraction of the entire contents of the vessel.

The extract solution is then withdrawn together with the hop-containing mash and subjected to a filtration. The weak filtered solution which is then obtained is thereafter preferably separated from the solvent by evaporating the latter in a vacuum at approximately 30° C. in a manner so as to protect the hop resins, so that the final product will consist of a completely pure, concentrated hop extract which has the consistency of thick honey. The solvent is then returned through condensers to the solvent tank and may be subsequently reused for further extractions.

According to a preferred embodiment of the invention, the enriched extract solution which has been withdrawn from the extraction vessel is collected in a container and then passed to a pre-evaporator in which it is thickened. The thickened extract which, however, still contains solvent, is then passed to a second thin-film-evaporation stage, for example, to a film still, from which the extract will be obtained in the form of a resin extract which is completely free of any solvent and which may then be packed in cans ready for shipment.

Since the extraction is carried out without heat and preferably under exclusion of air, and since the extract is filled from the film still directly into cans without any access of air, it will remain stable for a practically unlimited length of time, which is highly desirable for brewery purposes.

The extraction method according to the present invention has the great advantage that it may be carried out at very low temperatures so that the extracted substances of the hops will be fully protected from spoiling. The separation of the solvent from the extract is likewise carried out at the lowest possible temperature, preferably in a vacuum. When the process is completed, the pure extract obtained contains the bitter principles in the form of humulone and lupulone as the soft resins, while the hard resins do not exceed the limit which is inherent in the hops. The high degree of concentration of the extract of 80 to 95% of substances which will be active in the brewing process, that is, of substances which will be used in the beer depending upon the origin and quality of the hops, insures not only the stability of the product for an almost unlimited length of time, but also a very high productiveness in the form of isohumulone in the wort or in the beer, so that at the addition of the hops to the boiling mash the extract may be applied at a ratio of 1:8 to 1:12 as compared with the dry hops, depending upon the origin and quality of the hops. This fact by itself reveals the absolute novelty of the present invention as well as its important economical advantages.

The new extraction method will now be further described with reference to the accompanying diagrammatic drawing of an apparatus which may be used to carry out the method.

The dry hops are poured into the funnel-like hopper 1 from which they pass into the extraction vessel 2 which is equipped with a suitable dispersing apparatus, for example, a high-speed stirrer 3. At the same time or even previously thereto, solvent is added from a container 4, usually in the form of trichloroethylene. Due to the fine dispersion, the surface area of the hops and of their substances which are of value in the brewing process is considerably enlarged with the result that the actual extraction will be completed within a very short time. The mash is then drawn off into alternatingly operating filters 5, and after passing through these filters, the weak solution is passed into receivers 6. By means of a pump 7 the weak solution may then be returned to the extraction vessel 2 through a conduit 8 to be reused as the extracting agent for the next charge of hops. After being sufficiently enriched, the extract solution passes through a conduit 9 into a collecting tank 10 from which it is then passed through a conduit 11, pump 12 and conduit 13 to a preevaporator 14 in which by means of a regulator a part of the solvent is evaporated and passed through a conduit 15 to a condenser 16, and then through the latter and through a conduit 17 to the solvent tank 18. The thickened extract solution passes from the preevaporator 14 through a conduit 19 and a controlled dosing pump 20, and then through a conduit 21 to a thin-film-evaporating apparatus 22. The remainder of solvent is then evaporated in this film still 22 until the extract is entirely pure, and the solvent is thereupon condensed in a condenser 23 from which the condensate is then returned by a pump 24 through a conduit 25 to the solvent tank 18. The finished extract is finally drawn off by the thin-film-evaporator still 22 at 26 and by means of a pump 27 and passed through a conduit 28 from which it is filled into cans 29 which are then hermetically sealed and made ready for shipment.

The brewers' grains which remain as a residue in the filter press 5 are removed therefrom by being drawn through the outlet 33 and a conduit 34 into an evaporator 35. The solvent vapors developed therein are then condensed in the usual manner and, if necessary, separated from the water by conventional apparatus, not shown, whereupon the condensate is passed to the solvent tank 18.

Although our invention has been illustrated and described with reference to the preferred embodiment thereof, we wish to have it understood that it is in no way limited to the details of such embodiment, but is capable of numerous modifications within the scope of the appended claims.

Having thus fully disclosed our invention, what we claim is:

1. A process for producing hop extract comprising subjecting hops to the extracting action of a solvent selected from the group consisting of ether, alcohol, petroleum ether, hydrocarbons, chlorinated hydrocarbons and mixtures thereof, while simultaneously comminuting the hops whereby there is produced a dispersion of fine hop particles in said solvent and recovering the hop extract thereby formed.

2. A process according to claim 1 wherein said process is carried out in substantially absence of air and at substantially room temperature.

3. A process according to claim 1 wherein said hop-solvent mixture is subjected to stirring at high speeds.

4. A process according to claim 3 wherein said stirring is effected simultaneously with said comminuting.

5. A process according to claim 1 which comprises separating the hops from the extract solution and recycling the extract solution into the process for extracting a further quantity of hops.

References Cited in the file of this patent

UNITED STATES PATENTS

| | | |
|---|---|---|
| 1,232,098 | Schneider | July 3, 1917 |
| 2,248,153 | Wood | July 8, 1941 |